April 13, 1943.   O. B. SCHOENKY   2,316,460
GREASE RETAINER FOR CRANK PIN BEARINGS
Filed June 16, 1941    2 Sheets-Sheet 1
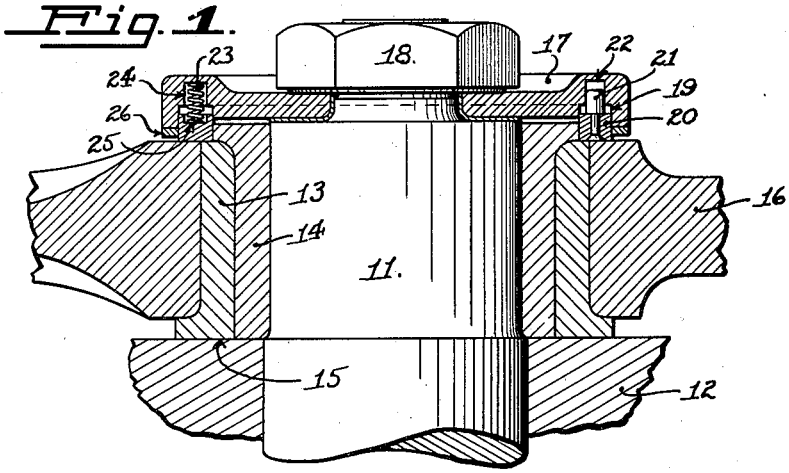
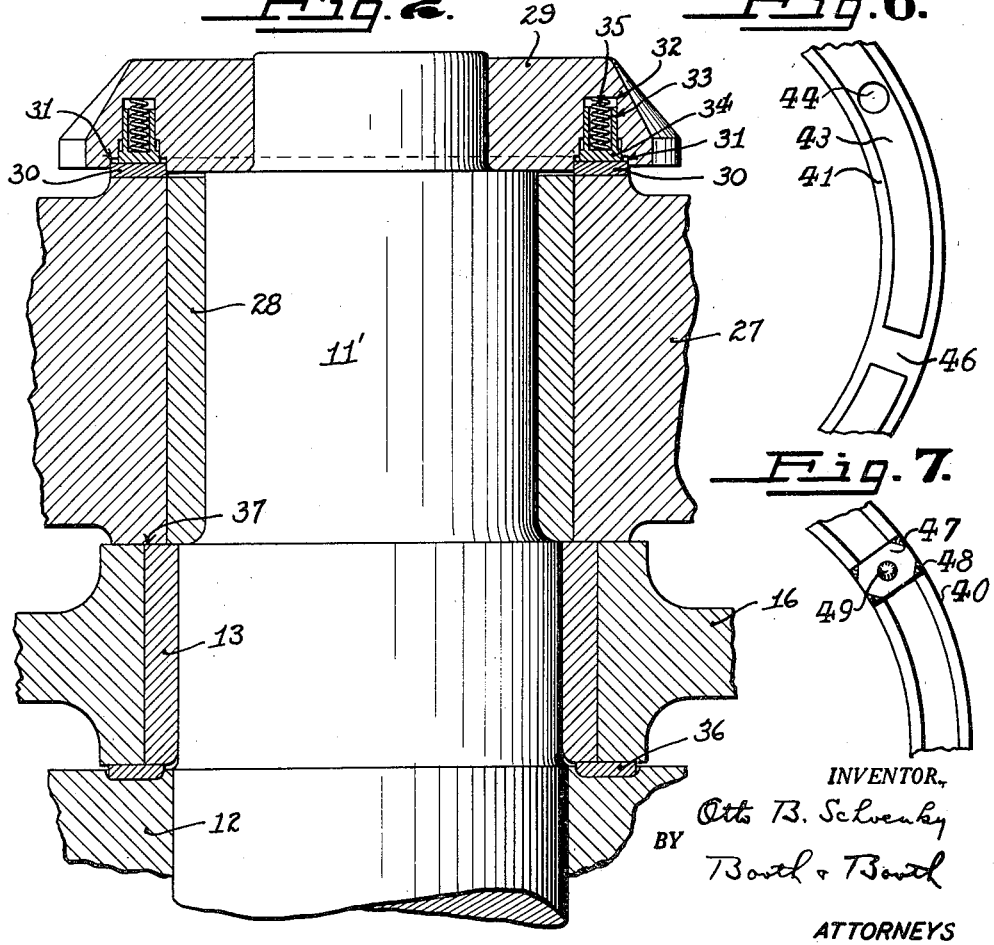
INVENTOR,
Otto B. Schoenky
BY Booth & Booth
ATTORNEYS April 13, 1943. O. B. SCHOENKY 2,316,460
GREASE RETAINER FOR CRANK PIN BEARINGS
Filed June 16, 1941 2 Sheets-Sheet 2
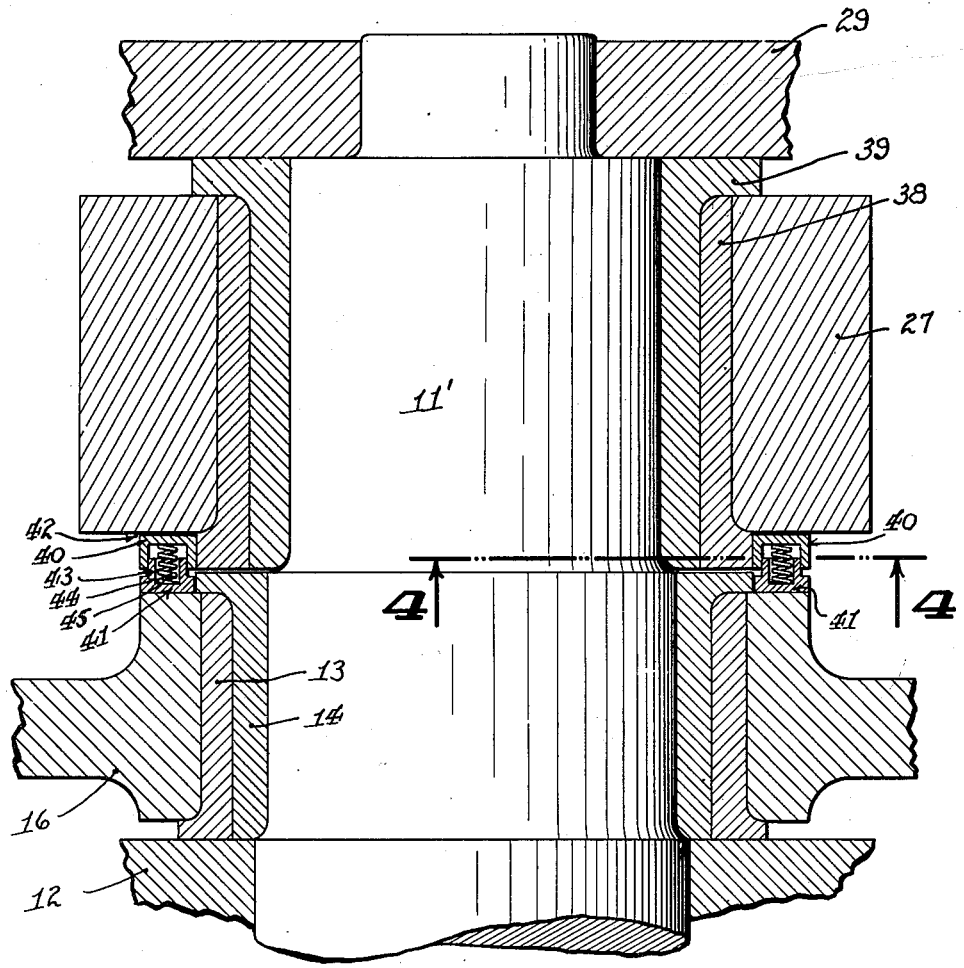
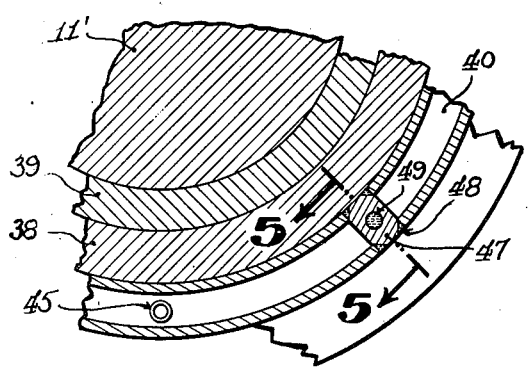
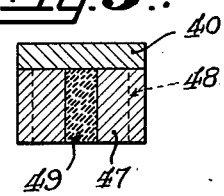
INVENTOR,
Otto B. Schoenky
BY Booth & Booth
ATTORNEYS Patented Apr. 13, 1943

2,316,460

UNITED STATES PATENT OFFICE 2,316,460

GREASE RETAINER FOR CRANKPIN BEARINGS

Otto B. Schoenky, Los Angeles, Calif.

Application June 16, 1941, Serial No. 398,271

2 Claims. (Cl. 308—36.2)

The present invention relates to grease retainers for journal bearings of the type in which a metal ring surrounds the journal and is pressed by springs against the end face of one of the moving parts.

The embodiments of the invention herein described and illustrated are designed for locomotive crank pin bearings. It is to be understood, however, that the invention can be applied, with or without minor structural changes, to other bearings.

The objects of the invention are to provide a device which will minimize the throwing out of grease or oil, even at high rotative speed; which will not cause appreciable friction; which can be cheaply made and easily installed in existing bearings, and which will have long life without danger of breaking. Other objects and advantages of the invention will be apparent from the following description, which should be read with the understanding that changes, within the scope of the claims hereto appended, may be made in the form, construction and arrangement of the several parts without departing from the spirit of the invention as defined in said claims.

Reference will be made to the accompanying drawings wherein:

Fig. 1 is a longitudinal section of a locomotive connecting rod bearing of usual type showing a simple form of my grease retainer applied thereto.

Fig. 2 is a longitudinal section of a main rod bearing showing a slightly modified form of my grease retainer designed especially for a position between the eccentric crank arm and the main rod. The same form of grease retainer can be used in reversed position between the connecting rod and the wheel center hub.

Fig. 3 is a section similar to Fig. 2 showing another modified form of my grease retainer especially designed for a position between the main rod and the connecting rod.

Fig. 4 is a fragmentary transverse section taken on the line 4—4 of Fig. 3.

Fig. 5 is a cross section of the grease retainer of Fig. 3, taken through one of the interlocking lugs, on the line 5—5 of Fig. 4.

Fig. 6 is a plan view of a portion of the male ring of the grease retainer shown in Fig. 3, illustrating the tongue or ridge and the key way therein for the reception of the key or interlocking lug shown in Figs. 4 and 5.

Fig. 7 is a plan view of a portion of the female ring illustrating the channel within which the tongue or ridge of Fig. 6 fits, and the key or interlocking lug which fits into the key way of Fig. 6.

In the drawings, the reference numeral 11 designates a locomotive crank pin secured in the wheel hub, a portion of which is shown at 12. 13 is the outer bushing, and 14 is the floating bushing, both of which have faced inner ends for contact with the face of the hub at 15. 16 is the connecting rod, and 17 is a collar fitting over the reduced end of the crank pin and secured thereon by a nut 18, for the purpose of holding the connecting rod and bushings on the crank pin. So much is usual construction.

In applying my grease retainer to the bearing shown in Fig. 1, the collar 17 is formed with an annular groove 19 in its inner face near its periphery, and in said groove is a ring 20 of brass or other suitable metal, having a smoothly ground inner face bearing against the outer face of the connecting rod 16 and the outer end of the outer bushing 13. The ring 20 closely surrounds the flange of the floating bushing 14, but is freely rotatable thereabout. In bearings having only one bushing, corresponding in position to the floating bushing 14, the ring 20 would bear either against the outer face of the connecting rod 16 immediately surrounding the outer flange or collar of the bushing, or against the outer end of said bushing.

The ring 20 is free to move in and out in the groove 19, but is prevented from turning therein by dowels, one being shown at 21, riveted in said ring and sliding in suitably positioned sockets 22 in the collar 17. There may be any desired number of such dowels and sockets, preferably four, distributed around the ring 20, but only one is shown in the drawings. The ring 20 is resiliently pressed inwardly against the face of the connecting rod 16 by coil springs 23 positioned in sockets 24 in the collar 17. Any number of such springs can be provided, preferably one between each two dowels, but only one appears in the drawings. The ring 20 has shallow sockets 25 to receive the inner ends of said springs.

The springs 23 not only press the ring 20 against the outer face of the connecting rod 16, but also press said rod inwardly, so that the inner ends of the bushings 13 and 14 are normally in contact at 15 with the face of the hub. Thus the bearing is sealed against out-throw of grease at its inner end at 15 and at its outer end by the ring 20. If lateral motion of the rod occurs, the springs yield, allowing the ring 20 to recede into its groove 19. The collar 17 is preferably provided with a bronze thrust ring 26 to limit the outward lateral movement of the connecting rod.

Fig. 2 illustrates a slight modification of my grease retainer as designed for the bearing of the main rod. The crank pin in this figure is designated 11', and the single bushing of the connecting rod 16 by 13'. The crank pin 11' extends outwardly and provides a bearing for the main rod 27, which has a single bushing 28. Beyond the main rod 27, the eccentric crank arm 29 is secured upon the reduced end of the crank pin 11', having the same function, so far as the bearing is concerned, as the collar 17 of Fig. 1.

The grease retainer ring, in this view numbered 30, bears against the outer face of the main rod 27 immediately surrounding its bushing 28. The eccentric arm 29 has an annular groove 31 formed in its inner face, in which the ring 30 floats freely. Sockets 32 are formed at suitable intervals in the bottom of the groove 31, and into each socket is a free fitting tubular casing 33 having an open outer end and a flanged head 34 at its inner end. Coil springs 35 within said casings press their heads against the ring 30, and press said ring against the outer face of the main rod 27. The groove 31 is shallower than the thickness of the ring 30, so that when said ring is forced to the bottom of its groove by lateral motion of the rods, it acts as a lateral liner to take the side thrust of said rods. Normally, however, the connecting rod 16 bears against a fixed lateral liner 36 positioned in the face of the wheel hub 12, and the main rod 27 bears against the connecting rod at 37, so that the bearing is sealed against out-throw of grease at three points.

Obviously, the grease retainer ring 30 and the fixed lateral liner 36 may be interchanged and reversed in position, if desired, in which case the normal lateral position of the rods 16 and 27 would be at the outer limit of their lateral movement. As this latter arrangement is a mere reversal in position of the structure shown in Fig. 2, it has not been separately illustrated.

The modification of my grease retainer shown in Figs. 3 to 7 is designed for a position between the main rod and the connecting rod, when such position is desired. The connecting rod 16 in this structure is shown as having an outer bushing 13 and a floating bushing 14. The main rod 27 is also shown with an outer bushing 38 and a floating bushing 39, the outer end of the latter providing a lateral bearing against the inner face of the eccentric arm 29.

The grease retainer in this form comprises an outer or female ring 40 and an inner or male ring 41. The outer ring 40 is channeled shaped in cross section, and is preferably made of steel with a bronze liner 42 secured to its outer surface, although other suitable materials may be used. The inner ring 41 has an annular upstanding ridge or tongue 43 which is made to have a free sliding fit in the groove or channel of the outer ring 40. At intervals in its circumference, the inner ring 41 is provided with sockets 44 in which coil springs 45 are seated, said springs forcing the two rings 40 and 41 apart.

In order to prevent the two rings 40 and 41 from turning one upon the other, suitable interlocking keys are provided, preferably two in number positioned diametrically apart, one being shown in Figs. 4 to 7. The ridge or tongue 43 of the inner ring is interrupted by a transverse slot or key way 46, and the outer ring 40 is provided with a transverse key 47, positioned to interlock with said slot. The key 47 is preferably formed as an octagonal block having a width equal to the outside width of the outer ring 40 and a height equal to the depth of the channel therein. The flanges of said ring are cut out, the block 47 is placed across the channel, and the triangular spaces at its corners are filled by welding, as indicated at 48. The block 47 is also formed with a central hole extending through it vertically, which is filled by welding as at 49. Thus the block is securely welded to the sides and bottom of the ring.

The grease retainer formed by the cooperating rings 40 and 41 is placed between the adjacent faces of the two rods 16 and 27, surrounding the flange of the outer bushing 38, as shown in Fig. 3. It forms a seal to prevent out-throw of grease at this point, and forces the rods, or rather the ends of their bushings, into contact with the respective faces of the wheel center and the eccentric arm, thereby sealing the bearing at all three points.

I claim:

1. In a locomotive crank pin bearing, a crank pin, a plurality of relatively movable members surrounding said pin having side faces, a grease retainer positioned between two of said side faces comprising a ring of channel shaped cross section having its back in contact with one of said faces, a second ring having an annular tongue portion movably fitted in the channel of the first ring, the back of the second ring being in contact with the other of said faces, said tongue portion having a plurality of spaced sockets and being interrupted at one point to form a transverse key way, a key secured within the channel of the first ring for engagement with said key way to prevent relative rotary movement of said rings, and coiled springs within said sockets acting to separate the rings and to press their backs yieldingly against said faces.

2. In a locomotive crank pin bearing, a crank pin, a plurality of relatively movable members surrounding said pin having side faces, a grease retainer positioned between two of said side faces comprising a ring of channel shaped cross section having its back in contact with one of said faces, a second ring having an annular tongue portion movably fitted in the channel of the first ring, the back of the second ring being in contact with the other of said faces, said tongue portion having a key way extending transversely through it from side to side and a plurality of sockets, a key secured to the first ring for engagement with said key way to prevent relative rotary movement of said rings, said key extending across the channel of the first ring through the sides thereof and being welded to said sides and to the bottom channel, and coiled springs within said sockets acting to separate the rings and to press their backs yieldingly against said faces.

OTTO B. SCHOENKY.